United States Patent
Chen (12) 
(10) Patent No.: US 6,891,351 B2
(45) Date of Patent: May 10, 2005

(54) CASING STRUCTURE FOR CHARGER WITH UPPER COVER

(75) Inventor: Chun-Chen Chen, Taoyuan (TW)

(73) Assignee: Delta Electronics, Inc., Taoyuan (TW)

( * ) Notice: Subject to any disclaimer, the term of this patent is extended or adjusted under 35 U.S.C. 154(b) by 48 days.

(21) Appl. No.: 10/442,116

(22) Filed: May 21, 2003

(65) Prior Publication Data

US 2004/0100224 A1 May 27, 2004

(30) Foreign Application Priority Data

Nov. 21, 2002 (TW) ...................................... 91218767 U (51) Int. Cl.[7] .......................................... H01M 10/46
(52) U.S. Cl. ...................................................... 320/115
(58) Field of Search .............................. 320/107, 110, 320/113, 114, 115

(56) References Cited

U.S. PATENT DOCUMENTS 5,659,236 A * 8/1997 Hahn .......................... 320/111
5,691,618 A * 11/1997 Kobayashi et al. .......... 320/115
6,049,192 A * 4/2000 Kfoury et al. ............... 320/113

* cited by examiner

Primary Examiner—Edward H. Tso
(74) Attorney, Agent, or Firm—Bacon & Thomas PLLC (57) ABSTRACT

A casing structure for a charger. The casing structure includes a main body, a connecting device, and an upper cover. The main body has a slot for receiving and charging an electronic apparatus, the connecting device has one end connecting to the main body, and the upper cover is connected with the other end of the connecting device and switched between a first position and a second position with respect to the main body. Thereby, the upper cover can be switched to the first position to support the electronic apparatus when the electronic apparatus is received and charged in the slot and switched to the second position to cover the slot when the electronic apparatus is not received and charged in the slot.

17 Claims, 8 Drawing Sheets

CASING STRUCTURE FOR CHARGER WITH UPPER COVER

FIELD OF THE INVENTION

The present invention relates to a casing structure for an electronic apparatus, and more particularly to a casing structure for a charger used in a mobile phone or an information appliance.

BACKGROUND OF THE INVENTION

Figure 1:
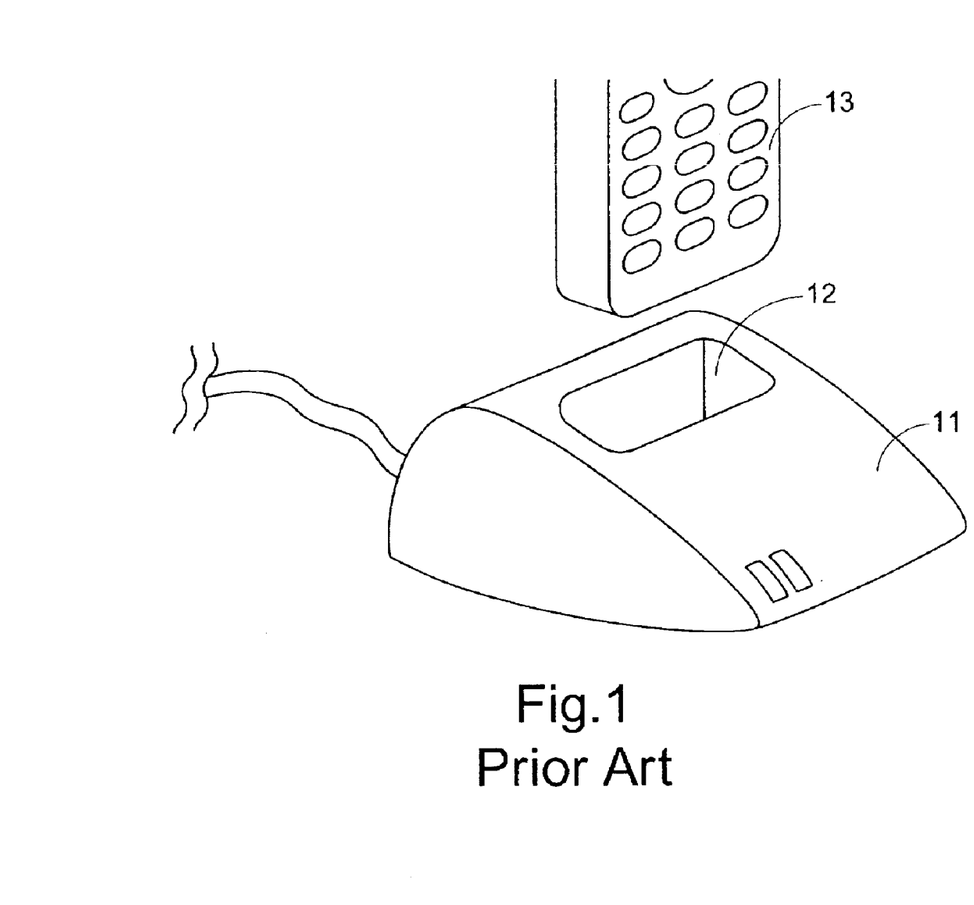
FIG. 1 is a schematic view showing a conventional casing structure for a charger.

Portable electronic apparatus, such as mobile phone, Personal Digital Assistant (PDA) or digital audio recorder, has become more and more popular in our daily life. In order to make the portable electronic apparatus available for use momentarily, an auxiliary battery or charger is needed to be carried with a user when the electric power of the original battery is exhausted. Therefore, the charger has become an essential accessory to maintain the electric power of the portable electronic apparatus anytime. Please refer to FIG. 1, which is a structural view of a traditional charger. As shown in FIG. 1, the traditional charger mainly includes a main body 11 having a slot 12 for receiving and charging an electronic apparatus 13, such as a mobile phone.

To place the mobile phone 13 firmly in the slot 12 of the main body 11, the thickness of a part of the main body 11 in the proximity of the slot 12 has to be designed larger than the rest parts of the main body 11 to prevent the mobile phone 13 from toppling down due to an non-uniform distribution of gravity during charging operation. Therefore, the entire thickness of the charger can not be further reduced, and the volume of the charger can not be downsized either. As a result, the traditional charger is not quite convenient for one who has to make a business trip to a distance location frequently or requires to carry a portable electronic device with him everyday.

On the other hand, the traditional charger is short of a dustproof design that can prevent dust from entering into the interior of the charger, and thus the slot 12 of the charger is always open to the external environment. When the charger is not in use, dust and dirty particles floating in the air or even a tiny insect may enter into the interior of the slot 12. When the charger is idle for a prolonged time, the conduction terminal (not shown) of the charger may be eroded due to a plethora of dust and dirty particles, and the charger may be inoperable or becomes poor in electric conduction. The charging effect of the charger is likely to be degraded accordingly.

Therefore, it is desired for the applicant to develop a suitable casing structure of a charger, which has a smaller size to provide an user with more convenience in portability. More particularly, the present invention addresses a charger with an upper cover for isolating the slot of the charger from dust and dirty particles.

SUMMARY OF THE INVENTION

Briefly summarized, the present invention discloses a casing structure for a charger which has a smaller size as compared with the prior art, wherein the casing structure has an upper cover for isolating a slot of the charger from dust and dirty particles. The casing structure according to a preferred embodiment of the present invention includes a main body, a connecting device, and an upper cover. The main body has a slot thereon for receiving and charging the electronic apparatus, wherein the connecting device has one end connecting to the main body, and the upper cover is connected to the other end of the connecting device and switched between a first position and a second position with respect to the main body. Therefore, when the electronic apparatus is required to be received and charged in the slot, the upper cover can be switched to the first position to support the electronic apparatus, or otherwise, the upper cover can be switched to the second position to cover the slot of the main body to isolate the slot from dust and dirty particles floating in the air.

The foregoing and other features and advantages of the present invention will be best understood through the following descriptions with reference to the accompanying drawings, wherein:

DETAILED DESCRIPTION OF THE PREFERRED EMBODIMENT

The present invention will now be described more specifically with reference to the following embodiments. Although the following embodiments use the charger of mobile phone to be exemplifications, it is not intended to be exhaustive or to be limited to the precise form disclosed. Any charger of the electronic apparatus such as rechargeable battery, digital audio recorder or PDA can be incorporated herein by reference.

Figure 2A:
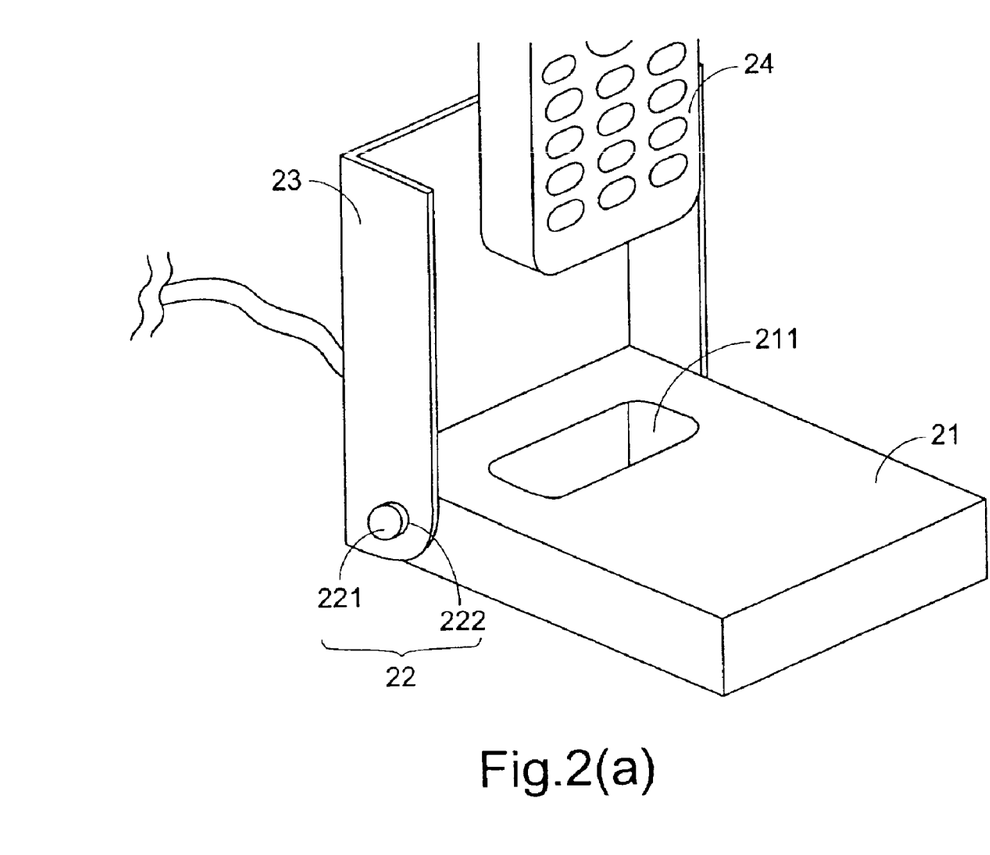
FIG. 2(a) is a schematic view showing a casing structure for a charger in which an upper cover is switched to a first position according to a first preferred embodiment of the present invention.

Please refer to FIG. 2(a), which is a structural view showing the casing structure in which an upper cover is switched to a first position according to a first preferred embodiment of the present invention. As shown in FIG. 2(a), a casing structure for a charger includes a main body 21, a connecting device 22 and an upper cover 23. The main body 21 has a slot 211 for receiving an electronic apparatus 24 such as a mobile phone, a rechargeable battery, a digital audio recorder, a Personal Digital Assistant and so on. The connecting device 22 further comprises a cam shaft 221 and a penetrating bore 222. The cam shaft 221 is either connected with the main body 21 or integrally formed on the main body 21, and the penetrating bore 222 is formed on the upper cover 23 and interconnects with the cam shaft 221. When the electronic apparatus 24 is intended to be received and charged in the slot 211, the upper cover 23 is switched to a first position by the action of the connecting device 22, as shown in FIG. 2(a). Then, the upper cover 23 will have a specific angle relative to the main body 21 to support the mobile phone 24 and prevent the mobile phone 24 from toppling down.

Figure 2B:
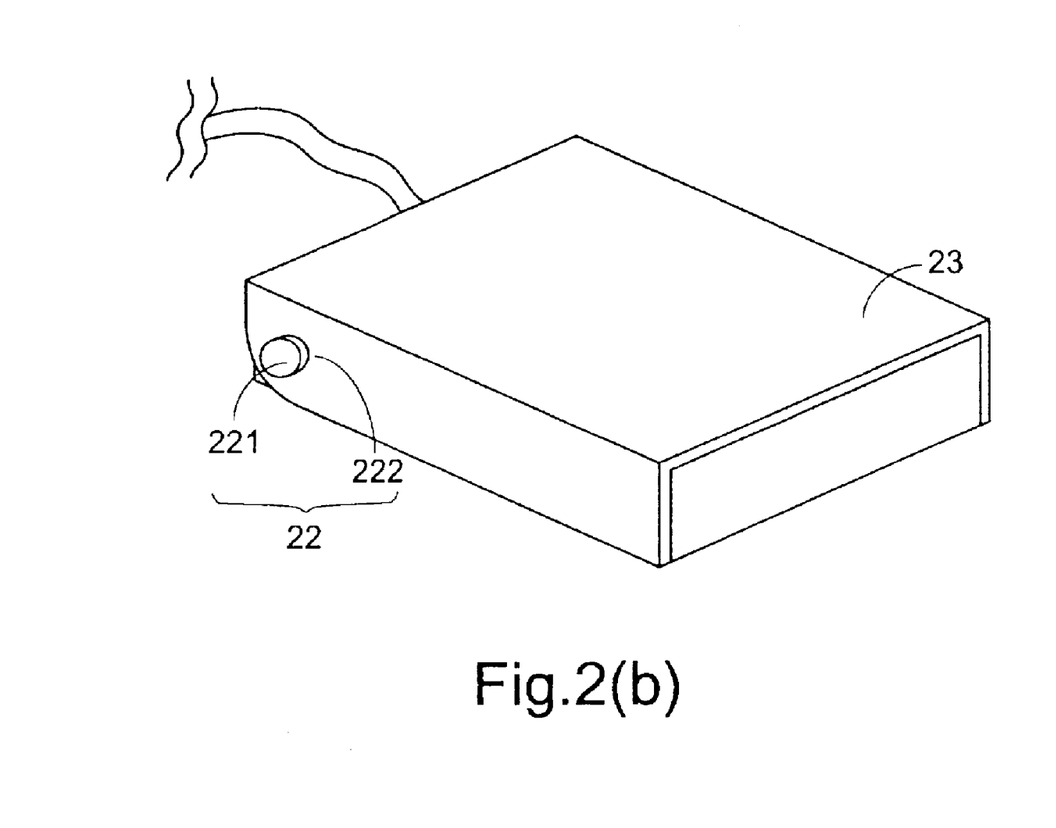
FIG. 2(b) is a schematic view showing a casing structure for a charger in which an upper cover is switched to a second position according to a first preferred embodiment of the present invention.

Please refer to FIG. 2(b), which is a structural view showing the casing structure in which an upper cover is switched to a second position according to the first preferred embodiment of the present invention. As shown in FIG. 2(b), the upper cover 23 is switched to a second position by the action of the connecting device 22 when the mobile phone 24 is unnecessary to be charged. Then, the upper cover 23 is capable of protecting the slot 221 and preventing dust or particles or insects from entering into the slot 211. Thereafter, the slot 211 will keep in clean, so that the conductivity of the charger will not be degraded.

Figure 3:
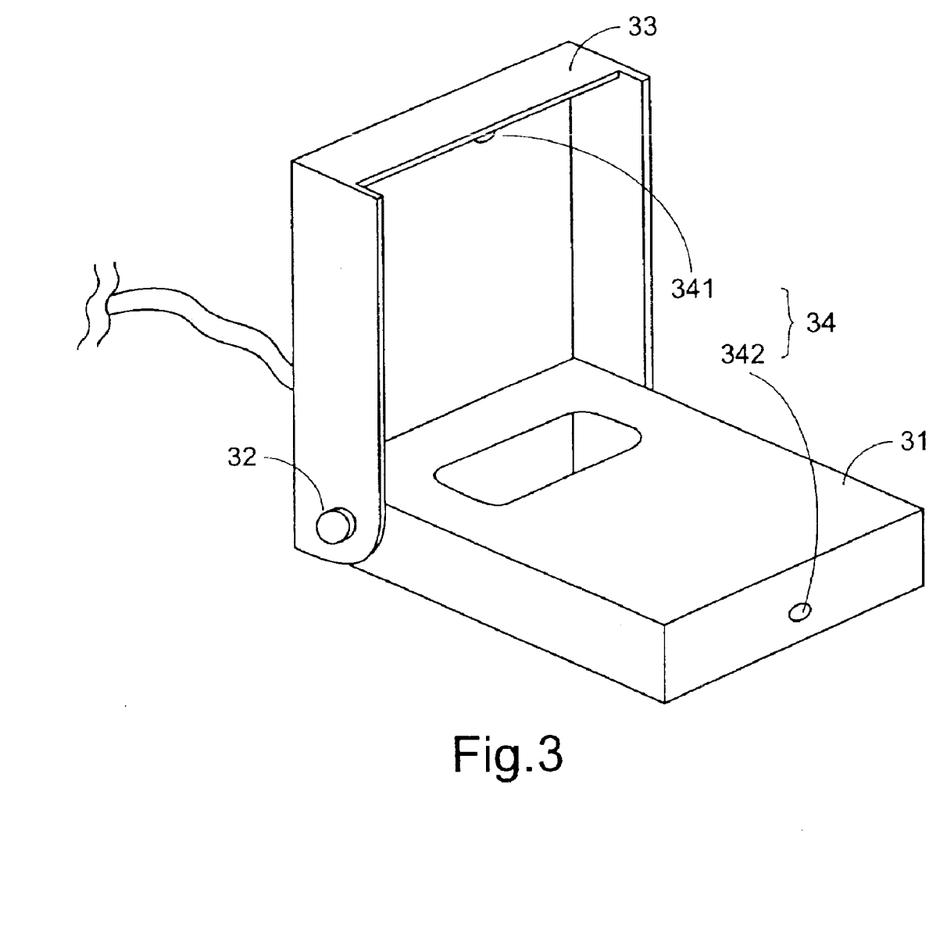
FIG. 3 is a mechanical view of a fastening device of the casing structure for a charger according to a first preferred embodiment of the present invention.

Please refer to FIG. 3, which shows a fastening device of the casing structure according to the first preferred embodiment of the present invention. As shown in FIG. 3, the casing structure for the charger further includes a fastening device 34 for allowing the upper cover 33 and the main body 31 to be fastened with each other. The fastening device 34 includes a protrusion 341 and a recess hole 342. The protrusion 341 is positioned on an inner side surface of the upper cover 33, and the recess hole 342 is positioned correspondingly to the protrusion 341 on an outer surface of the main body 31. When the upper cover 33 is switched to the second position, the protrusion 341 will be received in the recess hole 342 to firmly fasten the upper cover 33 on the main body 31.

Figure 4A:
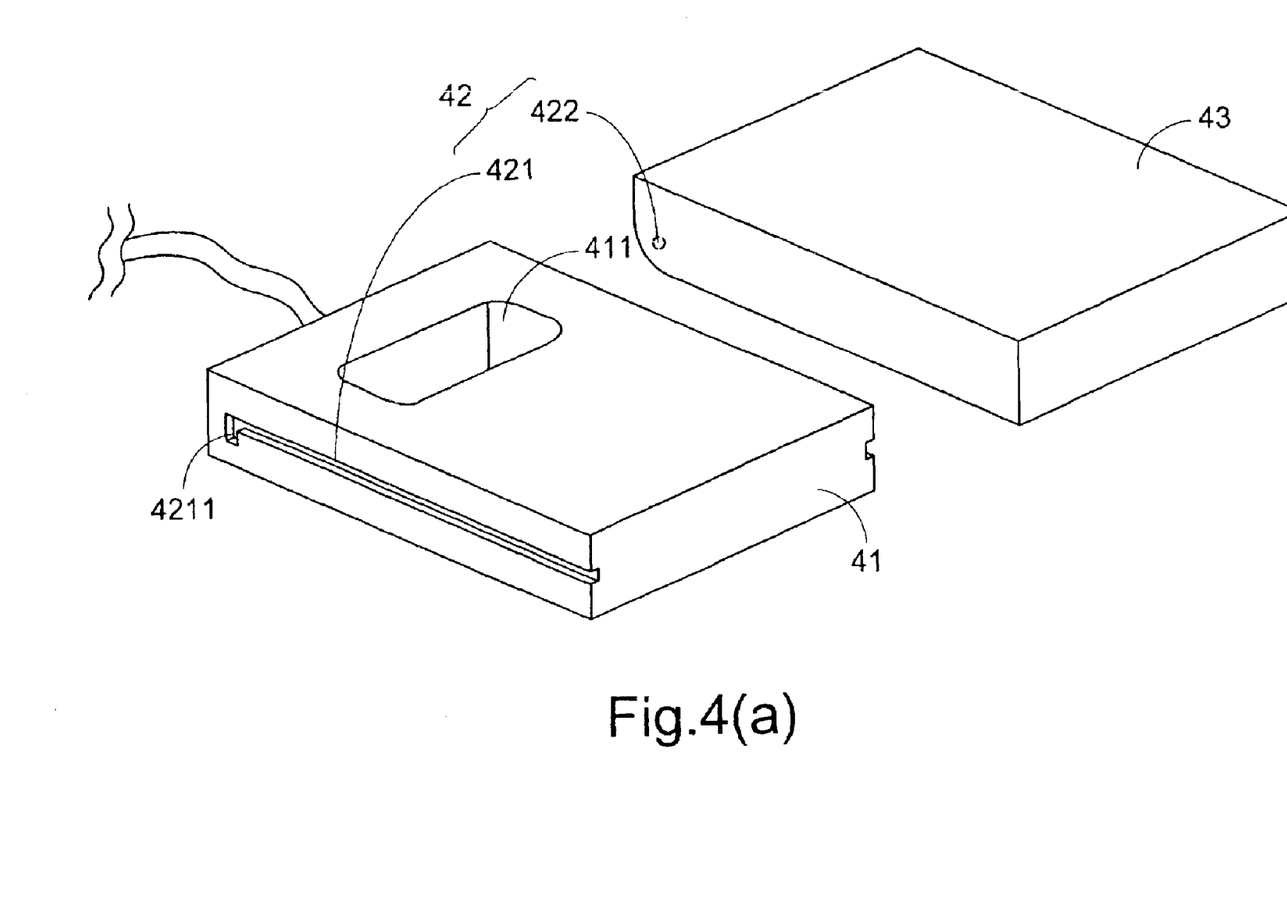
FIGS. 4(a)–(b) is a schematic view showing a casing structure for a charger according to a second preferred embodiment of the present invention.
Figure 4B:
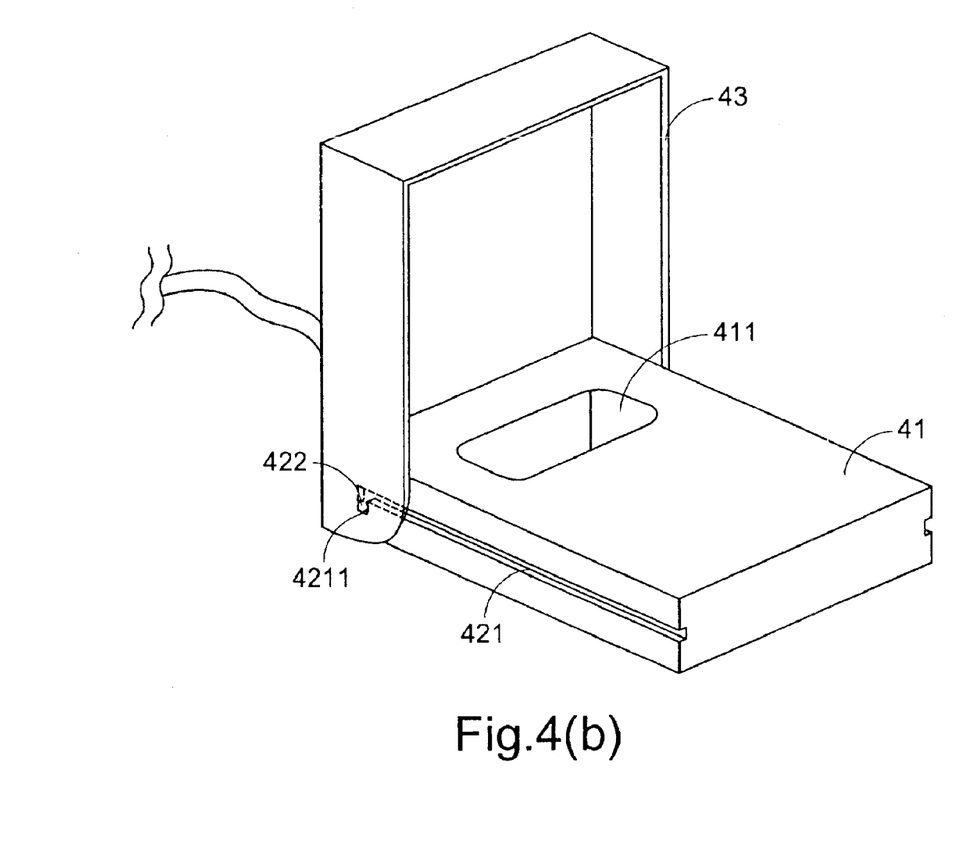

Please refer to FIGS. 4(a)–(b), which are structural views showing the casing structure according to a second preferred embodiment of the present invention. As shown in FIG. 4(a), the casing structure includes a main body 41, a connecting device 42, and an upper cover 43, wherein the upper cover 43 is detachably connected with the main body 41. The connecting device 42 further includes a first groove 421 and a first bulge 422, wherein the first groove 421 is positioned on an outer surface of the main body 41, and the first bulge 422 is positioned corresponding to the first groove 421 on an inner side surface of the upper cover 43 and is slidable in the first groove 421. When the charger is not required to be used any longer, the upper cover 43 can be switched to a second position indicated in FIG. 2(b) by the sliding of the first bulde 422 in the first groove 421, so that the upper cover 43 is able to cover the slot 411 on the main body 41. In this way, the slot 411 can be protected from the intrusion of dust and dirty particles.

In addition, the first groove 421 further includes a bent portion 4211 on one end thereof. When the charger is intended to be used, the upper cover 43 can be switched to a first position indicated in FIG. 2(a) by sliding the first bulde 422 to locate in the bent portion 4211 of the first groove 421, so that the upper cover 43 is able to support the mobile phone in the slot 411.

Figure 5A:
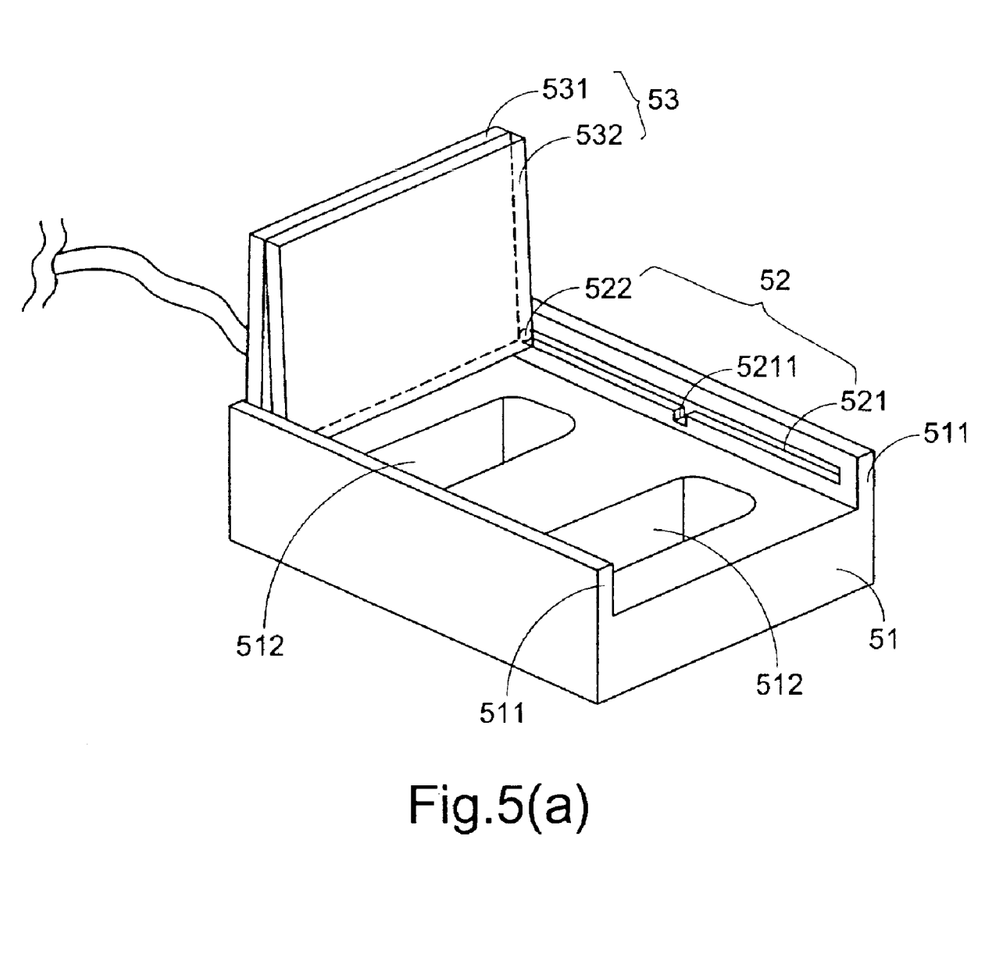
FIG. 5(a) is a schematic view showing a casing structure for a charger according to a third preferred embodiment of the present invention.

Please refer to FIG. 5(a), which is a structural view showing the casing structure according to a third preferred embodiment of the present invention. As shown in FIG. 5(a), the casing structure includes a main body 51, a connecting device 52, and an upper cover 53. The main body 51 has two slots 512, and a left side and a right side of the main body 51 both includes an extended sidewall 511. The connecting device 52 further includes a second groove 521 and a second bulge 522, wherein the second groove 521 is positioned on an inner side surface of the extended sidewall 511 and the second bulge 522 is positioned correspondingly to the second groove 521 on an outer surface of the upper cover 53 and is slidable in the second groove 521. Besides, the upper cover 53 can be folded in a first portion 531 and a second portion 532. If an electronic apparatus is needed to be charged, the upper cover 53 can be switched to the first position as shown in FIG. 2(a) by pushing the second portion 532 of the upper cover 53, so that the second portion 532 of the upper cover 53 can support the electronic apparatus while the electronic apparatus is undergoing a charging operation. However, if the front slot 512 is used only, the upper cover 53 is also able to support the electronic apparatus to be charged by the charger.

Figure 5B:
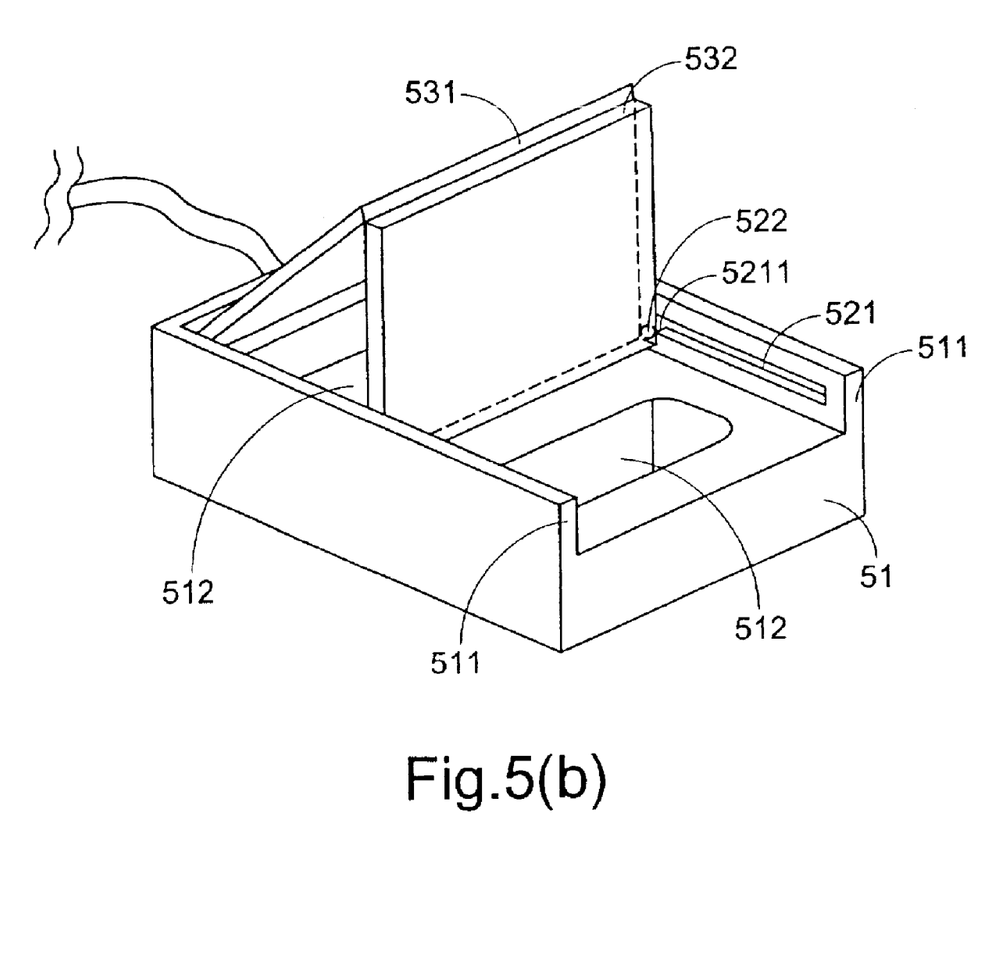
FIG. 5(b) is a schematic view showing a casing structure for a charger according to a fourth preferred embodiment of the present invention.

Please refer to FIG. 5(b), which is a structural view showing the casing structure according to a fourth preferred embodiment of the present invention. As shown in FIG. 5(b), the second groove 521 has a positioning piece 5211 located in the proximity of the center of the second groove 521 for positioning the second bulge 522. If the front slot 512 is used only, the second bulge 522 can be slid to the positioning piece 5211 within the second groove 521 so that the unused rear slot 512 can be covered with the first portion 531 of the upper cover 53, and thereby protect the rear slot 512 from the intrusion of dust and dirty particles.

The shape and form of the connecting device are not intended to be limitative by those described above, and in addition, the shape of the upper cover is not set fixedly, but can be set variably as long as it can cover the slot to isolate the slot from dust and dirty particles.

While the present invention has been described in terms of what are presently considered to be the most practical and preferred embodiments, it is to be understood that the present invention need not be restricted to the disclosed embodiment. On the contrary, it is intended to cover various modifications and similar arrangements included within the spirit and scope of the appended claims which are to be accorded with the broadest interpretation so as to encompass all such modifications and similar structures. Therefore, the above description and illustration should not be taken as limiting the scope of the present invention which is defined by the appended claims.

What is claimed is:

1. A casing structure for a charger, comprising:
   a main body having a slot for receiving and charging an electronic apparatus;
   a connecting device having one end connecting to the main body;
   an upper cover connected with the other end of the connecting device and switched between a first position and a second position with respect to the main body; and
   a fastening device configured for allowing the upper cover and the main body to be fastened with each other;
   wherein the upper cover is switched to the first position to support the electronic apparatus when the electronic apparatus is received and charged in the slot, and the upper cover is switched to the second position to cover the slot when the electronic apparatus is not received and charged in the slot.

2. The casing structure according to claim 1 wherein the electronic apparatus is a mobile phone.

3. The casing structure according to claim 1 wherein the electronic apparatus is a rechargeable battery.

4. The casing structure according to claim 1 wherein the electronic apparatus is a digital audio recorder.

5. The casing structure according to claim 1 wherein the electronic apparatus is a Personal Digital Assistant.

6. The casing structure according to claim 1 wherein a specific angle is formed between the upper cover and the main body to support the electronic apparatus when the upper cover is switched to the first position.

7. The casing structure according to claim 1 wherein the connecting device comprises a cam shaft and a penetrating bore.

8. The casing structure according to claim 7 wherein the cam shaft is connected with the main body or integrally formed on the main body, and the penetrating bore is formed on the upper cover and connected with the cam shift.

9. The casing structure according to claim 1 wherein the fastening device includes a protrusion and a recess hole.

10. The casing structure according to claim 9 wherein the protrusion is positioned on an inner side surface of the upper cover and the recess hole is positioned correspondingly to the protrusion on an outer surface of the main body.

11. The casing structure according to claim 1 wherein the connecting device comprises a first groove and a first bulge, wherein the first groove is positioned on an outer side surface of the main body, and the first bulge is positioned correspondingly to the first groove on an inner side surface of the upper cover and slidable in the first groove.

12. The casing structure according to claim 11 wherein the first groove comprises a bent portion.

13. The casing structure according to claim 1 wherein a left side and a right side of the main body both includes an extended sidewall.

14. The casing structure according to the claim 13 wherein the connecting device comprises a second groove and a second bulge, wherein the second groove is positioned on an inner side surface of the extended sidewall, and the second bulge is positioned correspondingly to the second groove on an outer surface of the upper cover and is slidable in the second groove.

15. The casing structure according to the claim 14 wherein the second groove has a positioning piece for positioning the second bulge.

16. The casing structure according to the claim 14 further comprising a plurality of slots.

17. The casing structure according to the claim 14 wherein the upper cover is foldable.

* * * * *